Patented July 9, 1935

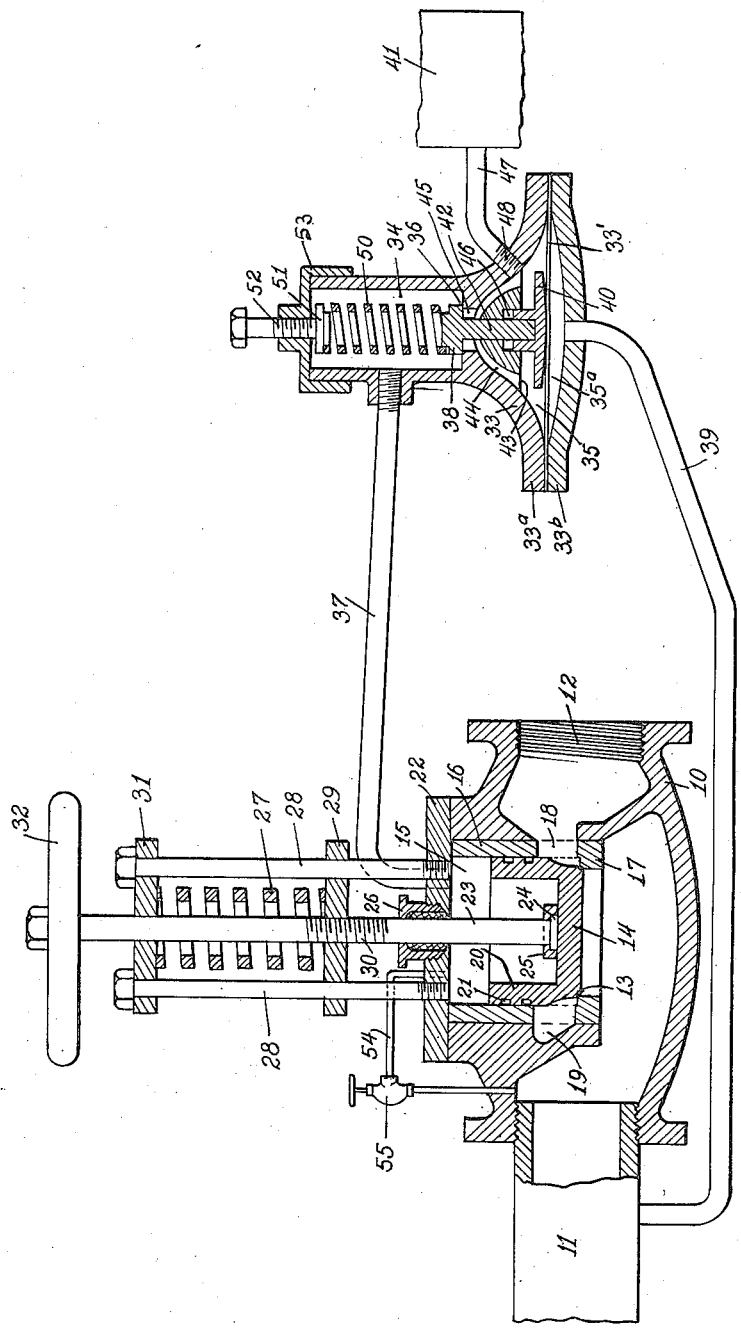

2,007,554

UNITED STATES PATENT OFFICE 2,007,554

PILOT CONTROLLED RELIEF VALVE

Henry E. Westerberg, Staten Island, N. Y.

Application February 19, 1934, Serial No. 711,871

2 Claims. (Cl. 137—53)

This invention relates to new and useful improvements in a pilot controlled relief valve.

The invention has for an object the construction of a relief valve which is characterized by a pilot arrangement to make its action more sensitive.

Still further the invention proposes the arrangement of means for causing a vacuum in a closed compartment of a relief valve to aid in opening the valve.

Still further the invention proposed the provision of a pilot controller operated by the steam controlled by the relief valve and associated with a vacuum chamber in such a manner that a vacuum is communicated to a certain portion of the relief valve to aid in the opening movement of the valve.

Still further the invention also contemplates an arrangement whereby a needle valve control bleed is arranged to break the vacuum which makes the relief valve more sensitive, when the vacuum is cut off upon lowering of the excess steam pressure which holds the relief valve open.

Still further the invention has for an object the construction of a novel controller equipped with a pilot valve for controlling a vacuum for the relief valve by reason of having a tail engaging a diaphragm controlled by steam from the inlet of the relief valve.

Still further the invention also proposes arrangements whereby the relief valve may be adjusted to operate at desirable pressures, and the controller adjusted to be harmonized with the operation of the relief valve.

As another object of this invention it is proposed to construct a device as mentioned which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:

The figure is a vertical sectional view of a pilot controlled relief valve according to this invention.

The pilot controlled relief valve according to this invention includes a relief valve body 10 having a steam inlet 11 and a steam outlet 12 separated by a valve seat 13. A relief valve 14 is engageable upon the seat 13 and is slidably arranged in a closed compartment 15 of the said body 10. The compartment 15 is formed in and constitutes the central opening of a cylindrical member 16 mounted within the body 10 and for this specification may be considered as a portion of the body 10. This cylindrical member 16 is attached to the body 10 as a unit. The cylindrical member 16 is formed with a bottom flange 17 having a central opening, and the top edge of this opening constitutes the valve seat 13. The cylindrical member 16 is formed with several side openings 18 communicating with an area 19 of the body connected with the outlet 12. The arrangement is such that the inlet 11 is divided from the outlet 12 when the valve 14 is upon the seat 13.

The valve 14 has a cylindrical extension 20 provided with packing rings 21 acting against the inside surface of the cylindrical member 16. These packing rings serve to maintain the condition of vacuum within the closed compartment 15 as hereinafter described. The valve body 10 has a top cap 22 secured over the top thereof closing the compartment 15. A stem 23 is formed with a bottom flange 24 rotatively engaging in a member 25 attached upon the valve 14 so that the stem may be turned for the purpose hereinafter described and the valve may be efficiently moved in the compartment 15 by moving the stem. A packing box 26 is mounted upon the top plate 22 at the area where the stem 23 extends to the exterior.

The valve 14 is normally urged upon its seat by a spring 27. More particularly a pair of bolts 28 are mounted vertically upon the plate 22 and slidably support a follower 29 threadedly engaging a threaded portion 30 of the stem 23. The spring 27 is mounted coaxially upon the stem 23 and between the follower 29 and a stationary plate 31 supported by the bolts 28 and acting against the heads of the bolts. The stem 23 extends through the plate 31 and at the extremity is provided with a hand wheel 32 by which it may be rotated. When the hand wheel 32 is turned the follower 29 will move along the stem 23 for adjustment of the tension of the spring 27 and consequent adjustment of the pressure at which the relief valve operates. Thus far the relief valve is substantially of conventional construction except for the provision of the closed compartment 15. The invention now departs from known practices in the provision of a pilot valve controller adapted to make the relief valve more sensitive.

The pilot valve controller includes a pilot valve casing 33 having a steam chamber 35ᵃ, a control chamber 34 and a vacuum chamber 35, the latter two chambers being separated with a pilot valve seat 36. The casing 33 is shown composed of two sections 33ª and 33ᵇ suitably attached together and a diaphragm 33' mounted between the sections 33ª and 33ᵇ separates the steam chamber 35ª from the vacuum chamber 35.

A control pipe 37 connects the control chamber 34 with the top of the compartment 15 for the purpose as hereinafter described. A pilot valve 38 is arranged within the control chamber 34 for the purpose of engaging the seat 36 so as to cut off communication between the chambers 34 and 35. A pipe 39 is connected from the steam inlet 11 to the steam chamber 35ª. A tail 40 from the pilot valve 38 is in the vacuum chamber 35 and engages against the diaphragm 33' for opening the pilot valve 38 when the pressure in the steam chamber exceeds a certain amount. A vacuum chamber 41 is connected with the vacuum chamber 35 for producing a vacuum in the control chamber 34 when the pilot valve is open.

The pilot valve 38 is provided with a stem 42 which extends downwards into the vacuum chamber 35. The tail 40 is of inverted mushroom shape and attached upon the lower end of this stem. The pilot valve casing 33 has a flat interior surface 43 against which the valve tail 40 may engage to limit opening of the pilot valve. The adjacent surface of the valve tail 40 is flat for engaging the flat surface 43. Several passages 44 extend from the flat surface 43 to an area 45 immediately below the pilot valve 38. The casing 33 has a recessed area 46 in which a stem of the valve tail 40 slidably engages.

The vacuum chamber 41 is connected with a pipe 47 to a port 48 in the pilot casing 33.

A spring 50 is arranged for normally urging the pilot valve 38 upon its seat. This spring 50 is associated with a mechanism by which its tension may be adjusted. More particularly one end of the spring 50 engages directly upon the top of the pilot valve 38 and the other end upon a member 51 mounted upon a screw 52 which is extended through a cap 53 upon the top of the pilot casing 33. This cap 53 serves to close the control chamber 34. The arrangement is such that the screw 52 may be turned in one or the other direction for the purpose of adjusting the tension of the spring 50 and the pressure at which the pilot valve 38 will open. A small bleed pipe 54 connects the inlet 11 with the compartment 15. A needle valve 55 is included in the pipe line 54 for controlling the passage of steam to the compartment 15 to normally maintain the valve in closed position.

The operation of the device is as follows: The handle 32 is turned for turning the stem 23 for adjusting the tension of the spring 27 to balance the relief valve 14 so as to close the valve 14. The screw 52 should be turned to adjust the pressure of the spring 50 according to the pressure desired for the operation of the relief valve. When the steam in the inlet 11 reaches this pressure the valve 38 will open since the steam from the inlet acts through the pipe 39 and in the steam chamber 35ª to move the diaphragm 33' and the tail 40 of the pilot valve 38.

When the steam from the inlet 11 increases to such an extent that the pressure in the steam chamber 35ª moves the diaphragm 33' against the tail 40 of the pilot valve 38, forcing it open, the vacuum from the vacuum chamber 41 will evacuate the control chamber 34 and the compartment 15 thru the line 37 and this causes the valve 14 to become unbalanced and to open so that the excess steam pressure may blow off through the outlet 12. When the pressure in the inlet 11 falls to normal the spring 50 will return the pilot valve 38 upon its seat and cut off the vacuum in the vacuum chamber 41 to the control chamber 34. The vacuum in the compartment 15 will immediately become negative by the passage of steam from the inlet 11 through the bleed 54 into the compartment 15. Consequently the spring 27 will act to close the valve 14.

A feature of the invention is the construction wherein the pilot valve functions to aid in the operation of the relief valve 14 to render the said relief valve more sensitive. It will be readily understood that the operation of the relief valve alone would not be as sensitive as its control by the pilot valve for this reason; when the relief valve functions the valve must open against the action of the spring, such as spring 27 which holds it closed, and it takes a greater and greater force to compress the spring as the valve opens. For example, assume that 100 pounds will compress the spring 27 one quarter of an inch. Therefore for the valve 14 to open ½ an inch it will require a load of 200 or more pounds upon the valve 14. In addition since it is necessary that no steam escape from the relief valve, the stem 23 will be retarded because of the packing box 26 in the container.

The bleed 54 will have a tendency to balance the valve 14 in that there will be a tendency for the substantially same steam pressure to be present on both sides of the valve 14. Consequently the spring 27 may be adjusted to be more sensitive to the pressure at which the relief valve operates. Of course the spring 50 of the controller must also be properly adjustable to obtain the correct functioning of the relief valve at a desired pressure.

While I have illustrated and described my invention with some degree of particularity, I realize that in practice various alterations therein may be made. I therefore reserve the right and privilege of changing the form of the details of construction of the correlated parts without departing from the spirit or the scope of the appended claims.

Having thus described my invention, what I claim as new, and desire to secure by United States Letters Patent, is:

1. In a pilot control relief valve, a relief valve body having a steam inlet and a steam outlet separated by a valve seat, a relief valve member engageable on said seat and sliding in a closed compartment in said body, resilient means urging said valve member upon its seat, a pilot valve casing having a top control chamber, an intermediate vacuum chamber and a bottom steam chamber, said control chamber and vacuum chamber being separated by a pilot valve seat and said vacuum chamber and steam chamber being separated by a diaphragm, a control pipe connecting said control chamber with said compartment, a pilot valve member in the control chamber for engaging said pilot valve seat and having a stem engaging against the top of said diaphragm, a vacuum chamber connected with the vacuum chamber, a pipe from said steam inlet to said steam chamber, and a bleed pipe from said steam inlet to said closed compartment.

2. In a pilot control relief valve, a relief valve body having a steam inlet and a steam outlet separated by a valve seat, a relief valve member engageable on said seat and sliding in a closed compartment in said body, resilient means urging said valve member upon its seat, a pilot valve casing having a top control chamber, an intermediate vacuum chamber and a bottom steam chamber, said control chamber and vacuum chamber being separated by a pilot valve seat and said vacuum chamber and steam chamber being separated by a diaphragm, a control pipe connecting said control chamber with said compartment, a pilot valve member in the control chamber for engaging said pilot valve seat and having a stem engaging against the top of said diaphragm, a vacuum chamber connected with the vacuum chamber, a pipe from said steam inlet to said steam chamber, and a bleed pipe from said steam inlet to said closed compartment, the area of said diaphragm being larger than the area of the top of said pilot valve member.

HENRY E. WESTERBERG.